(12) United States Patent
Seo et al.

(10) Patent No.: US 8,721,953 B2
(45) Date of Patent: May 13, 2014

(54) INJECTION MOLD FOR INTAKE HOSE AND INTAKE HOSE PRODUCTION METHOD USING THE SAME

(75) Inventors: Yong Gyo Seo, Suwon-si (KR); Bunyeon Jeong, Busan (KR); Jae-Yong Jeon, Cheonan-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 250 days.

(21) Appl. No.: 13/167,148

(22) Filed: Jun. 23, 2011

(65) Prior Publication Data

US 2011/0316195 A1 Dec. 29, 2011

(30) Foreign Application Priority Data

Jun. 25, 2010 (KR) ........................ 10-2010-0060763

(51) Int. Cl.
*B29C 45/40* (2006.01)

(52) U.S. Cl.
USPC ........ 264/328.1; 264/334; 264/335; 425/556; 425/577

(58) Field of Classification Search
USPC ................ 264/328.1, 334, 335; 425/556, 577
See application file for complete search history.

(56) References Cited

U.S. PATENT DOCUMENTS

| | | | | |
|---|---|---|---|---|
| 3,752,436 A | * | 8/1973 | Deutsch | 249/145 |
| 5,225,215 A | * | 7/1993 | Syvrud | 425/438 |
| 2006/0125149 A1 | * | 6/2006 | Takada et al. | 264/328.2 |

FOREIGN PATENT DOCUMENTS

| | | |
|---|---|---|
| JP | 5-200758 A | 8/1993 |
| JP | 10-77920 A | 3/1998 |
| JP | 2009-173038 A | 8/2009 |
| KR | 10-0300851 B1 | 9/2001 |
| KR | 10-0526141 B1 | 11/2005 |
| KR | 10-0774768 B1 | 11/2007 |
| WO | WO 2005/016626 A1 | 2/2005 |

* cited by examiner

*Primary Examiner* — Jill Heitbrink
(74) *Attorney, Agent, or Firm* — Morgan, Lewis & Bockius LLP

(57) ABSTRACT

An injection mold for an intake hose and an intake hose production method utilizes a main core removably dualized to automatically extract a molding-completed intake hose from the main core after injection molding is completed and an air supplying member supplying compressed air between the main core and the molding-completed intake hose is configured in the main core to automatically extract the intake hose from the main core without an additional extraction equipment, thereby reducing an entire manufacturing process and saving a manufacturing cost.

7 Claims, 7 Drawing Sheets

INJECTION MOLD FOR INTAKE HOSE AND INTAKE HOSE PRODUCTION METHOD USING THE SAME

CROSS-REFERENCE TO RELATED APPLICATION

This application claims priority to and the benefit of Korean Patent Application No. 10-2010-0060763 filed Jun. 25, 2010, the entire contents of which application is incorporated herein for all purposes by this reference.

BACKGROUND OF INVENTION

1. Field of Invention

The present invention relates to an injection mold for an intake hose and an intake hose production method using the same, and more particularly, to an injection mold for an intake hose that automatically separates a finished product of the intake hose from a main core at the time of separating a mold after injection molding is completed and an intake hose production method using the same.

2. Description of Related Art

In general, fuel and air are required to actuate an engine which is a power source at the time of driving a vehicle and cool air (new air) which the engine requires is supplied to the engine from the outside of the vehicle through an intake system.

Herein, the intake system employs an intake hose connecting an air filter and the engine so as to serve to filter foreign materials such as dusts or sand included in air introduced from the outside of the vehicle and isolate vibration generated from the engine.

As such, as materials of the intake hose employed in the intake system of the engine, rubber, thermoplastic elastomer (TPE), and a mixture of thermoplastic elastomer (TPE) and polypropylene (PP) are used. Among them, since thermoplastic elastomer (hereinafter, referred to as 'TPE') is lighter in weight and more excellent in durability than rubber, TPE is generally used.

The intake hose made of TPE is manufactured by injection molding and an injection mold used in injection molding includes upper and lower molds that are separately configured to form an external shape of the intake hose and have a cavity when they are coupled with each other and a main core disposed in the cavity between the upper and lower molds and forming an internal shape of the intake hose.

Molten TPE materials is injected into the injection mold configured as above through an injection machine receiving and injecting molten materials to mold the intake hose and when the molding is completed, the upper and lower forms are separated from each other and the main core is separated from the cavity of the separated upper and lower forms.

Thereafter, a worker extracts a molding-completed intake hose from the main core on an external circumference of the main core.

Herein, since it is difficult to extract the intake hose directly from the main core due to a bellows shape formed in the intake hose, the worker inflates the intake hose by using compressed air to extract the intake hose from the main core.

That is, in the extraction of the intake hose from the main core, first, a release cup connected with an air gun supplying compressed air is inserted between the main core and the intake hose while covering a release sheet to cover the bellows shape of the intake hose and a release band is tied to seal a space between the intake hose and the release cup.

In this state, the worker actuates the air gun to supply compressed air between the main core and the intake hose to inflate the intake hose and forcibly extracts the intake hose from the main core to separate the intake hose.

In this case, the release sheet serves to prevent a bellows of the intake hose from being excessively inflated to be damaged due to the supply of compressed air.

However, in the known injection mold for the intake hose, since the worker should forcibly extract the finished product of the intake hose from the main core through the above-mentioned plural working processes after completing the molding of the intake hose, a working time increases.

Further, additional equipments such as the release sheet, the air gun, the release cup, and the release band should be used due to the shape of the bellows in order to extract the molding-completed intake hose from the main core, thereby causing a manufacturing cost to be increased, and when supplied compressed air excessively inflates the intake hose, the size of the finished product is changed to deteriorate merchantability and increase defective rate, at the time when the worker directly forcibly extracts the intake hose.

The above information disclosed in this Background section is only for enhancement of understanding of the background of the invention and therefore it may contain information that does not form the prior art that is already known in this country to a person of ordinary skill in the art.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for an injection mold for an intake hose, including an upper mold and a lower mold combinably provided to form an external shape of the intake hose, slide cores forming the upper mold and the lower mold and a cavity therein, and a main core inserted into the cavity to form an internal shape of the intake hose, wherein the main core includes a first core having a bellows portion formed at one side of an external circumference thereof and provided to be movable vertically through a moving member, a second core provided to be coupled with the first core and having an external circumference thereof surrounded by the slide cores, and an air supplying member supplying compressed air between the first and second cores that are coupled with each other and the intake hose when separating the upper mold and the lower mold after molding of the intake hose is completed.

The air supplying member may include an air compressor, an air supplying pipe formed in a length direction in the second core, and an air outlet connected with the air supplying pipe and formed to discharge compressed air introduced through the air supplying pipe between the main core and the molding-completed intake hose.

The moving member may include a mounting block coupled with the first core, an actuating rod connected with the mounting block, and an actuating cylinder connected with the actuating rod to move the mounting block.

In the first core, the bellows portion may have a cross-sectional shape of a triangular shape or a sawtooth-like shape.

The second core may be coupled to the bottom of the first core and formed in a curve shape curved at a predetermined angle on the basis of the first core.

One aspect of the present invention provides an intake hose production method using an injection mold for an intake hose, the method including (a) combining the upper mold and the lower mold in the state where the first core and the second core are coupled with each other, (b) injecting molten materials into the combined injection mold, and (c) separating the intake hose by supplying compressed air between the molding-completed intake hose and the main core.

In step (c), compressed air is supplied between the first core and the molding-completed intake hose by actuating the air supplying member and in the state where the supplied compressed air inflates the intake hose to form a space between the first core and the intake hose, an actuating cylinder connected with the first core moves backwards to separate the first core from the intake hose.

In an injection mold for an intake hose and an intake hose production method using the same according to various aspects of the present invention, a main core is dualized so as to automatically extract a molding-completed intake hose from the main core after injection molding is completed and configure an air supplying member supplying compressed air is configured between the main core and the molding-completed intake hose to automatically extract the intake hose from the main core without an additional extraction equipment, thereby reducing an entire manufacturing process and saving a manufacturing cost.

Further, the dualized main core is easily separated from the intake hose of which a total weight is reduced and the molding is completed, by changing and applying the shape of a bellows of the intake hose, such that workability is improved and the intake hose is prevented from being excessively inflated as compared with the related art, thereby improving merchantability.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
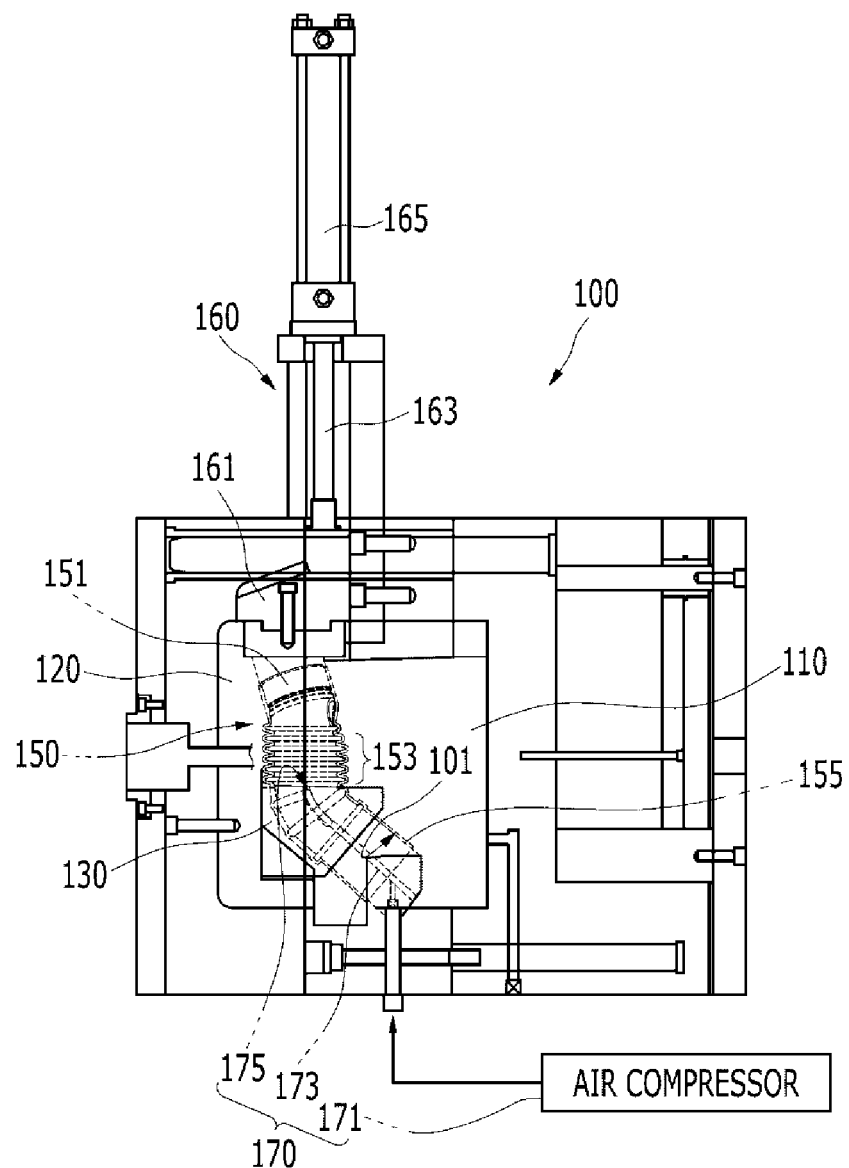
FIG. 1 is a front view of an exemplary injection mold for an intake hose according to the present invention.
Figure 2:
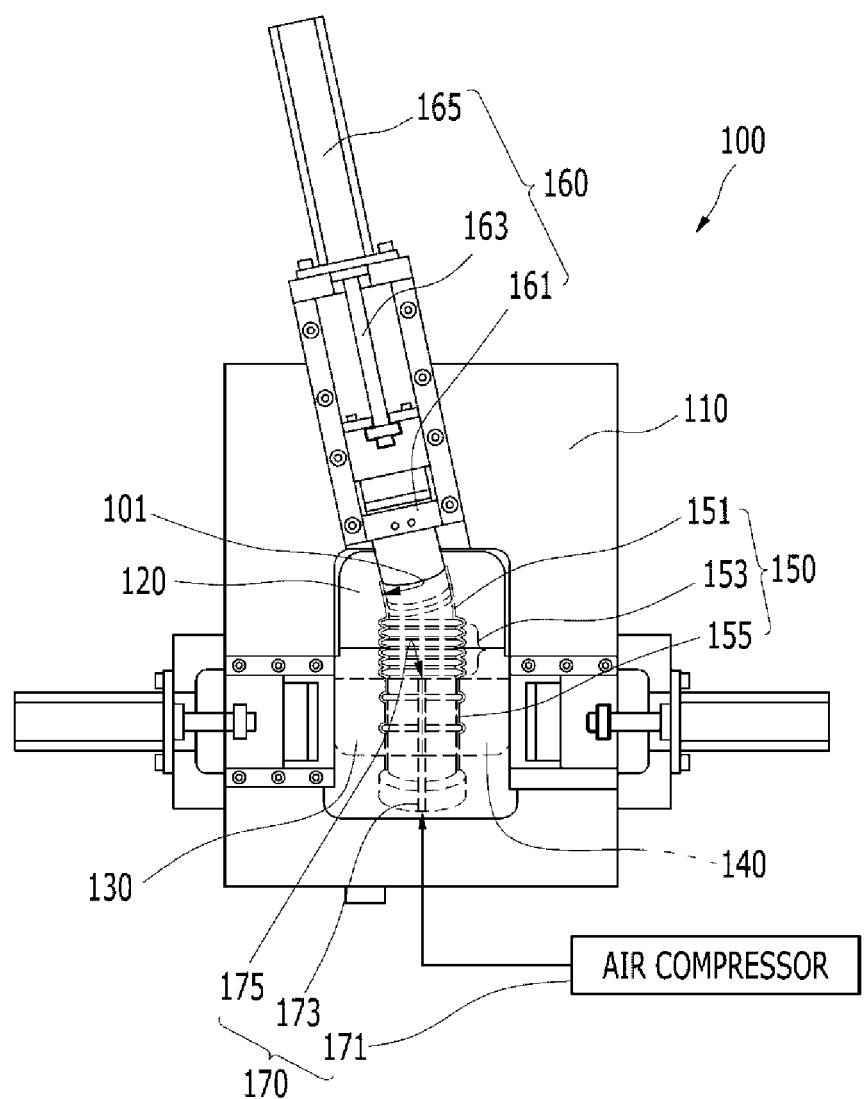
FIG. 2 is a side view of an exemplary injection mold for an intake hose according to the present invention.
Figure 3:
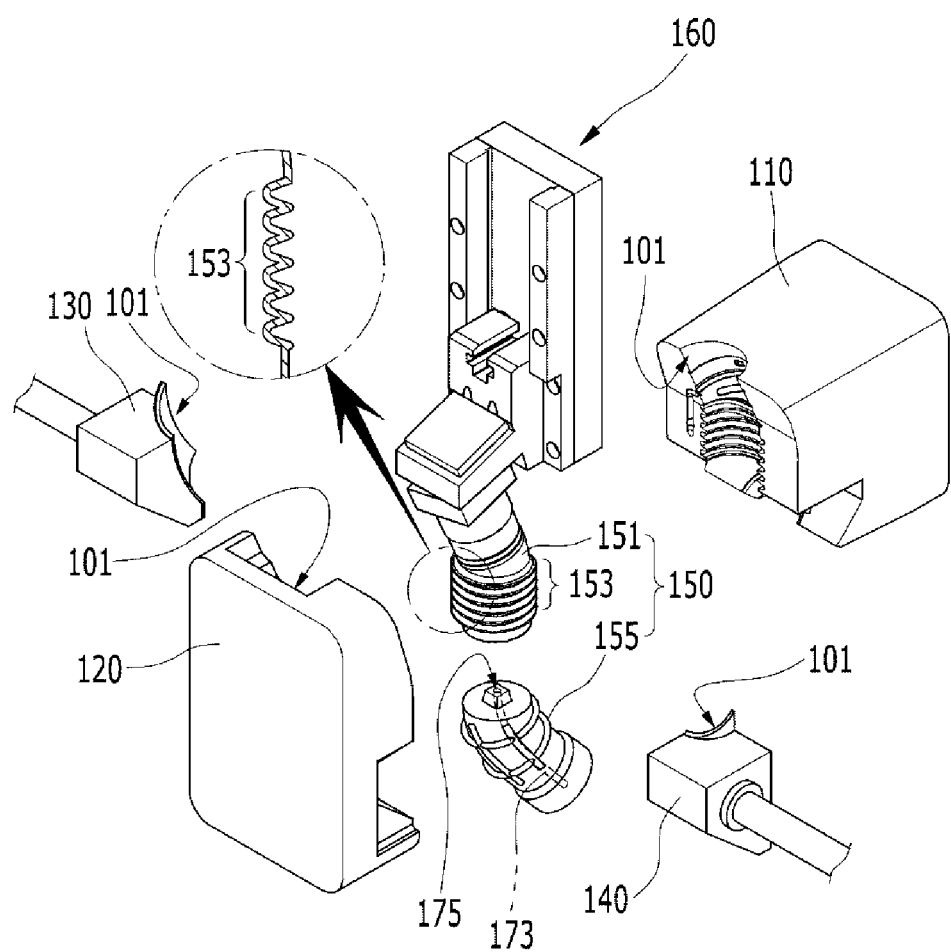
FIG. 3 is an exploded perspective view of an exemplary injection mold for an intake hose according to the present invention.

FIG. 1 is a front view of an injection mold for an intake hose according to an exemplary embodiment of the present invention, FIG. 2 is a side view of an injection mold for an intake hose according to various embodiments of the present invention, and FIG. 3 is an exploded perspective view of an injection mold for an intake hose according to various embodiments of the present invention.

Figure 5:
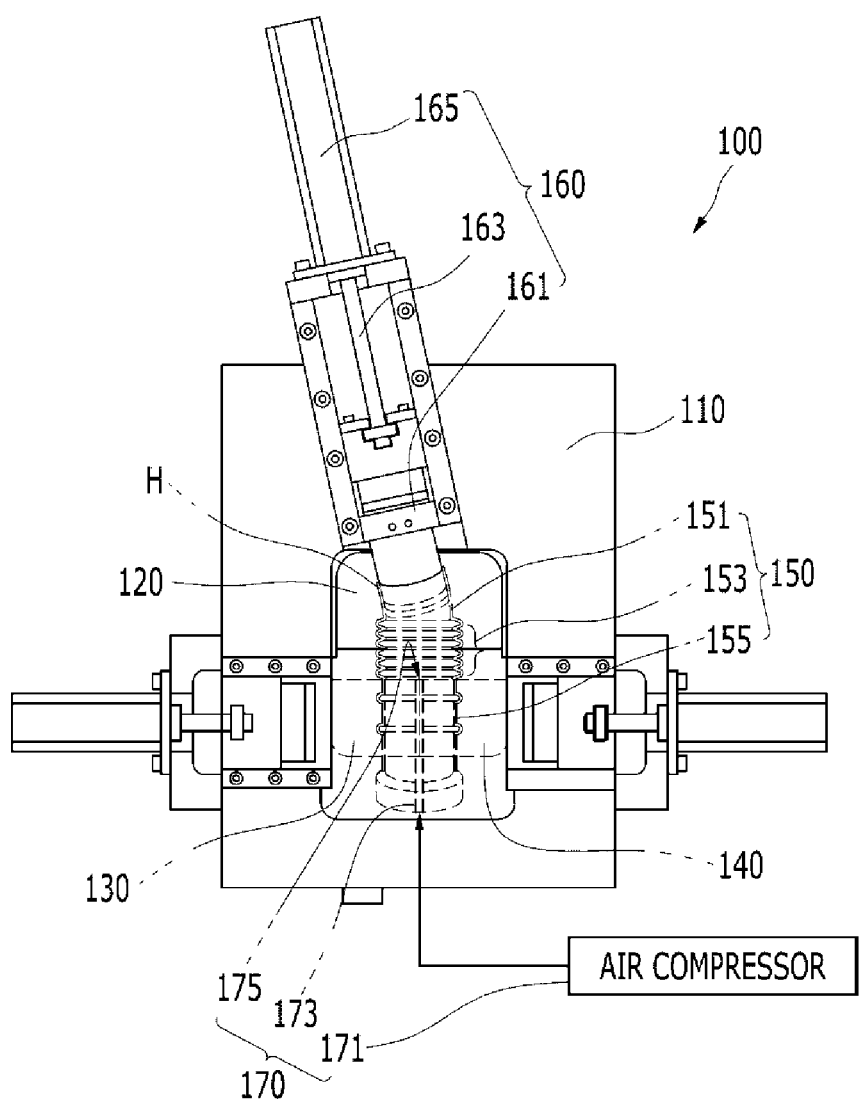
FIGS. 5 to 7 are diagrams showing an operational state for each step of an exemplary injection mold for an intake hose for describing an intake hose production method using an injection mold for an intake hose according to the present invention.

Referring to the figures, in an injection mold 100 for an intake hose and an intake hose production method using the same according to various embodiments of the present invention, a main core 150 is removably dualized so as to automatically extract a molding-completed intake hose H of FIG. 5 from the main core 150 after injection molding is completed. In addition, an air supplying member 170 supplying compressed air between the main core 150 and the molding-completed intake hose H is configured to automatically extract the intake hose H from the main core 150 without an additional extraction equipment, thereby reducing an entire manufacturing process and saving a manufacturing cost.

For this, the injection mold 100 for the intake hose according to various embodiments of the present invention basically includes an upper mold 110 and a lower mold 120 separately configured to form an external shape of the intake hose H, slide cores 130 and 140 forming the upper mold 110 and the lower mold 120, and a cavity 101 therein, and a main core 150 inserted into the cavity 101 to form an internal shape of the intake hose H, as shown in FIGS. 1 to 3.

The injection mold 100 having the above configuration receives molten materials from an injection machine (not shown) to achieve injection molding.

Herein, the main core 150 according to various embodiments of the present invention includes a first core 151 and a second core 155.

The first core 151 has a bellows portion 153 formed at one side of an external circumference thereof and is provided to be movable vertically through a moving member 160.

The bellows portion 153 may have a cross-sectional shape, such as a triangular shape or a sawtooth-like shape, as shown in FIG. 3. In the case where the bellows portion 153 has the shape, it is more easy to extract the intake hose H at the time of extracting the intake hose H and it is possible to secure flexibility of the intake hose H.

In various embodiments, the moving member 160 includes a mounting block coupled with the first core 151, an actuating rod 163 connected with the mounting block 161, and an actuating cylinder 165 connected with the actuating rod 163 to move the mounting block 161.

In addition, the second core 155 is provided to be coupled with the first core 151 and an external circumference of the second core 155 is surrounded by the slide cores 130 and 140.

Herein, the second core 155 may be formed in a curve shape curved at a predetermined angle on the basis of the first core 151.

In various embodiments, the air supplying member 170 is configured in the second core 155 to supply compressed air between the first and second cores 151 and 155 that are coupled with each other and the intake hose H after molding of the intake hose H is completed.

The air supplying member 170 includes an air compressor 171, an air supplying pipe 173, and an air outlet 175. The components will be hereinafter described in more detail.

First, the air compressor 170 may be installed outside the injection mold 100.

In various embodiments, the air supplying pipe 173 is formed in a length direction of the second core 155 in the second core 155.

In addition, the air outlet 175 is connected with the air supplying pipe 173 and is formed on the top surface of the second core 155 to discharge compressed air introduced through the air supplying pipe 173 between the main core 150 and the molding-completed intake hose H.

That is, an operation of the air supplying member 170 configured as above will be described below.

First, when the upper mold 110 and the lower mold 120 are separated from each other after injection molding of the intake hose H is completed, compressed air supplied from the air compressor 171 is discharged to the air outlet 175 of the second core 155 through the air supplying pipe 173.

Herein, in the state where the first core 151 and the second core 155 are combined with each other, the upper mold 110 and the lower mold 120 are separated from each other and thereafter, the actuating cylinder 165 of the moving member 160 moves backwards minutely to form a minute gap between the first core 151 and the second core 155 and compressed air is introduced between the main core 150 and the molding-completed intake hose H by passing through the air outlet 175 through the gap.

Meanwhile, although the air supplying member 170 is configured in the second core 155 in various embodiments, the present invention is not limited thereto and the air supplying member 170 may be configured in the first core 151, and the positions of the air supplying pipe 173 and the air outlet 175 and the numbers of the air supplying pipes 173 and the air outlets 175 may be modified and applied.

Hereinafter, an intake hose production method using the injection mold 100 for the intake hose according to various embodiments of the present invention configured as above will be described in detail.

Figure 4:
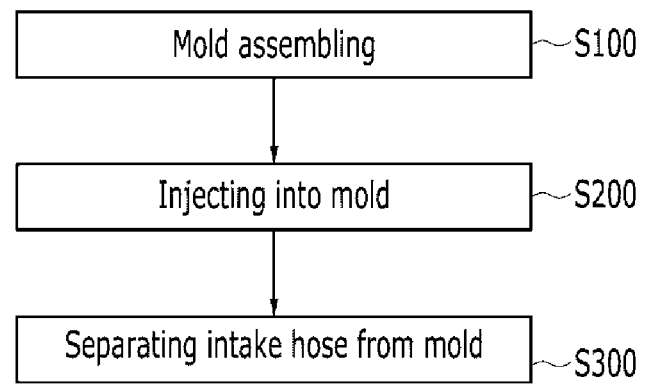
FIG. 4 is a block diagram showing an exemplary intake hose production method using an injection mold for an intake hose according to the present invention.
Figure 6:
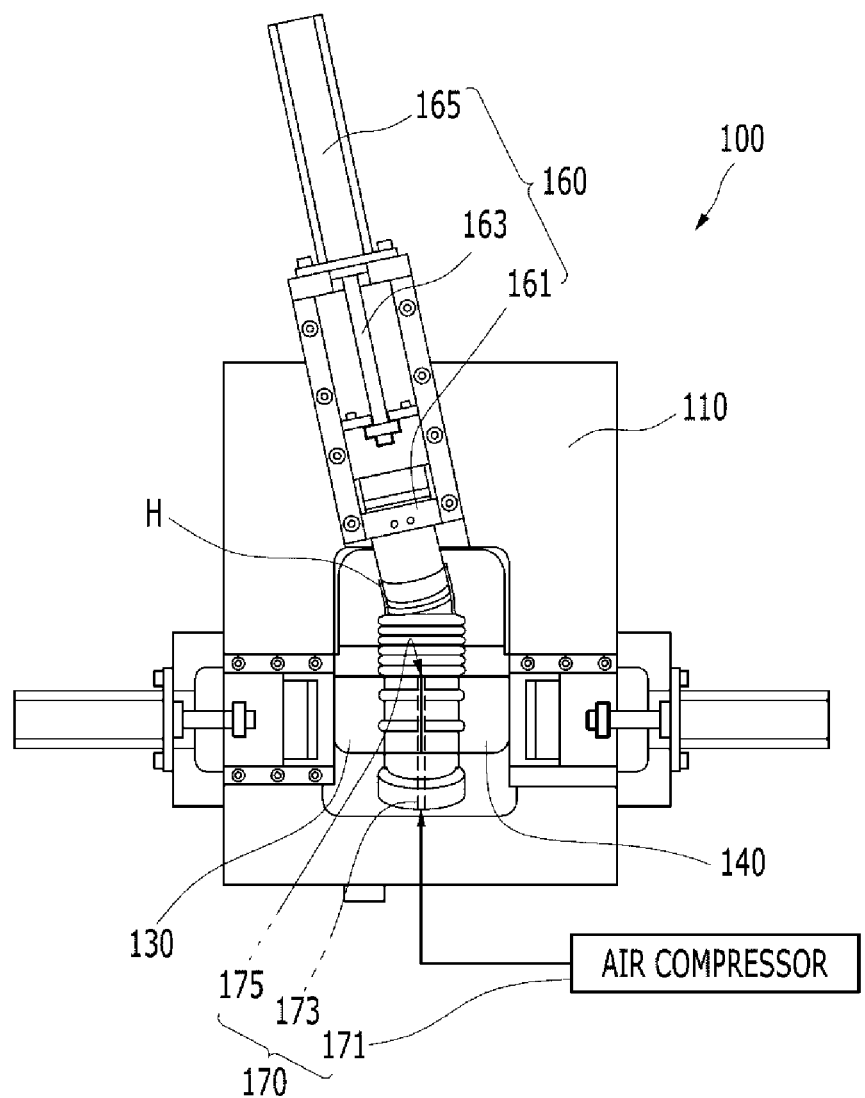
Figure 7:
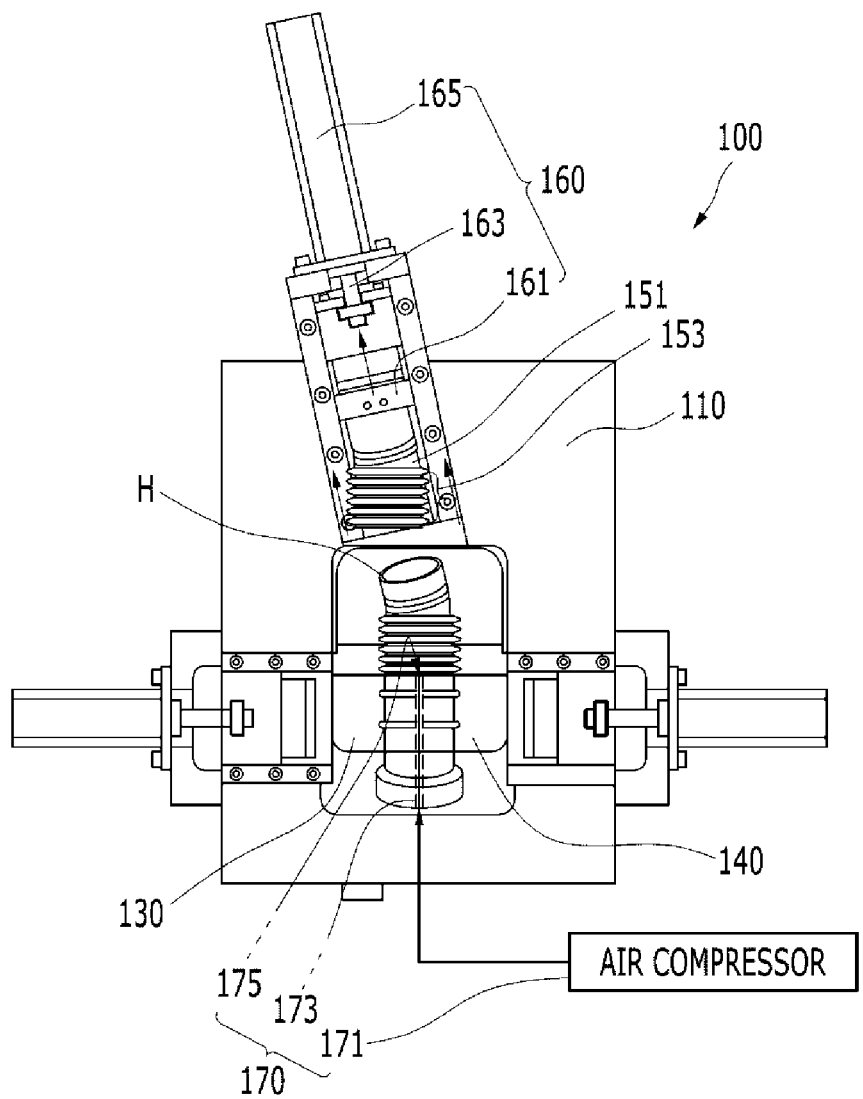

FIG. 4 is a block diagram showing an intake hose production method using an injection mold for an intake hose according to various embodiments of the present invention, and FIGS. 5 to 7 are diagrams showing an operational state for each step of an injection mold for an intake hose for describing an intake hose production method using an injection mold for an intake hose according to various embodiments of the present invention.

The intake hose production method using the injection mold 100 for the intake hose according to various embodiments of the present invention includes (a) combining the upper mold 110 and the lower mold 120 in the state where the first core 151 and the second core 155 are coupled with each other, (b) injecting molten materials from an injection machine into the combined injection mold 100, and (c) separating the intake hose H by supplying compressed air between the molding-completed intake hose H and the main core 150.

First, as shown in FIG. 5, in the state where the first core 151 and the second core 155 are coupled with each other in the cavity 101 of the upper mold 110, the upper mold 110 and the lower mold 120 are combined with each other (S100) and thereafter, the molten materials from the injection machine are injected into the combined injection mold 100 (S200).

In addition, the injection from the injection machine is completed and thereafter, when the molding of the intake hose H is completed in the injection mold 100, the molding-completed intake hose H is separated from the main core 150 to complete extraction (S300).

Herein, in step S300, as shown in FIGS. 5 and 6, the upper mold 110 and the lower mold 120 are separated from each other and thereafter, compressed air is supplied between the main core 150 and the molding-completed intake hose H by actuating the air supplying member 170.

Therefore, the compressed air supplied through the air supplying member 170 inflates the intake hose H to form a space between the first core 151 and the intake hose H.

In this state, as shown in FIG. 7, the actuating cylinder 165 of the moving member 160 moves backwards to move the actuating rod 163 backwards, and as a result, the first core 151 connected to the actuating rod 163 through the mounting block 161 is separated from the molding-completed intake hose H by the actuating rod 163 that moves backwards.

As such, the compressed air supplied from the air compressor 171 is discharged through the air outlet 175 formed on the top surface of the second core 155 to inflate the molding-completed intake hose H, through step S300. As the intake hose H is inflated, the space is formed between the molding-completed intake hose H and the main core 150. At this time, the first core 151 is moved through the operation of the moving member 160 to be separated from the intake hose H.

That is, according to the intake hose production method using the injection mold 100 for the intake hose according to various embodiments of the present invention, the upper mold 110 and the lower mold 120 are separated from each other and thereafter, the first core 151 is automatically separated from the molding-completed intake hose H without a worker's manual operation, thereby reducing a working time and improving workability.

Accordingly, in the injection mold 100 for the intake hose having the configuration as above and the intake hose production method using the same according to various embodiments of the present invention, a main core 150 is dualized into a first core 151 and a second core 155 so as to automatically extract a molding-completed intake hose H from the main core 150 after injection molding is completed, and an air supplying member 170 supplying compressed air between the main core 150 and the molding-completed intake hose H is configured in the second core 155 to automatically extract the intake hose H from the main core 150 without an additional extraction equipment, thereby reducing an entire manufacturing process and saving a manufacturing cost.

Further, the first cost 151 of the dualized main core 150 is easily separated from the intake hose H of which a total weight is reduced and the molding is completed by forming the shape of a bellows of the intake hose H as a triangular shape or a sawtooth-like shape, thereby improving workability.

For convenience in explanation and accurate definition in the appended claims, the terms upper or lower, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An injection mold for an intake hose, comprising:
   an upper mold and a lower mold which together form an external shape of the intake hose;
   slide cores coupled with the upper mold and the lower mold, thereby forming a cavity therein with the upper mold and the lower mold;
   a main core inserted into the cavity to form an internal shape of the intake hose,
   wherein the main core includes:
      a first core having a bellows portion formed at one side of an external circumference thereof and provided to be movable vertically through a moving member, and
      a second core provided to be coupled with the first core and having an external circumference thereof surrounded by the slide cores; and
      an air supplying member, after molding of the intake hose is completed, supplying compressed air through the second core for separating the first core from the intake hose after separating the upper mold and the lower mold from each other.

2. The injection mold of claim 1, wherein the air supplying member includes:
   an air compressor;
   an air supplying pipe formed in a length direction in the second core; and
   an air outlet connected with the air supplying pipe and formed to discharge compressed air introduced through the air supplying pipe between the main core and the molding-completed intake hose.

3. The injection mold of claim 1, wherein the moving member includes:
   a mounting block coupled with the first core;
   an actuating rod connected with the mounting block; and
   an actuating cylinder connected with the actuating rod to move the mounting block.

4. The injection mold of claim 1, wherein in the first core, the bellows portion has a cross-sectional shape of a triangular shape or a sawtooth-like shape.

5. The injection mold of claim 1, wherein the second core is coupled to the bottom of the first core and is formed in a curve shape curved at a predetermined angle on the basis of the first core.

6. An intake hose production method using the injection mold for an intake hose of claim 1, the method comprising:
   (a) combining the upper mold and the lower mold in the state where the first core and the second core are coupled with each other;
   (b) injecting molten materials into the combined injection mold; and
   (c) separating the intake hose by supplying compressed air between the molding-completed intake hose and the main core, after separating the upper mold and the lower mold from each other.

7. The method of claim 6, wherein in step (c), compressed air is supplied between the first core and the molding-completed intake hose by actuating the air supplying member and in the state where the supplied compressed air inflates the intake hose to form a space between the first core and the intake hose, an actuating cylinder connected with the first core moves backwards to separate the first core from the intake hose.

* * * * *